US008015116B2

(12) United States Patent
Crandell

(10) Patent No.: US 8,015,116 B2
(45) Date of Patent: Sep. 6, 2011

(54) METHODS FOR AUTHENTICATION

(75) Inventor: Jeffrey L. Crandell, Hermosa Beach, CA (US)

(73) Assignee: Newport Scientific Research LLC, Newport Beach, CA (US)

( * ) Notice: Subject to any disclaimer, the term of this patent is extended or adjusted under 35 U.S.C. 154(b) by 1023 days.

(21) Appl. No.: 11/814,341

(22) PCT Filed: Jan. 20, 2006

(86) PCT No.: PCT/US2006/001900
§ 371 (c)(1),
(2), (4) Date: Jul. 19, 2007

(87) PCT Pub. No.: WO2006/078820
PCT Pub. Date: Jul. 27, 2006

(65) Prior Publication Data
US 2008/0172341 A1  Jul. 17, 2008

Related U.S. Application Data

(60) Provisional application No. 60/646,048, filed on Jan. 21, 2005.

(51) Int. Cl.
*G06F 21/00* (2006.01)
(52) U.S. Cl. .................. 705/64; 713/186; 726/6; 726/7; 726/18; 726/19
(58) Field of Classification Search .................. None
See application file for complete search history.

(56) References Cited

U.S. PATENT DOCUMENTS

| 5,509,070 | A | 4/1996 | Schull |
| 6,389,535 | B1 | 5/2002 | Thomlinson et al. |
| 6,490,680 | B1 * | 12/2002 | Scheidt et al. ............... 713/166 |
| 2003/0074568 | A1 | 4/2003 | Kinsella et al. |
| 2005/0021984 | A1 * | 1/2005 | Hollander .................... 713/186 |

OTHER PUBLICATIONS

Huiluo, Paul Henry, A Common Password Method for Protection of Multiple Accounts; 2003 IEEE; pp. 2749-2754.
International Serach Report for PCT/US06/01900.

* cited by examiner

*Primary Examiner* — Jamie Kucab
(74) *Attorney, Agent, or Firm* — Rader, Fishman & Grauer PLLC

(57) ABSTRACT

A method for managing access to application software contained on a computer system or network. The computer system utilizes an authentication component that is configured to receive a unique user account identifier and to generate an authentication passkey by using an identifying data element, typically called a "password". The identifying data elements are collected from one or more input devices and used as an encryption key for the user account identifier. The generated authentication passkey is used in an authentication transaction associated with the application software instead of the identifying data element thereby reducing data security risks if the identifying data element alone were discovered due to other unknowns including the encryption elements.

23 Claims, 18 Drawing Sheets

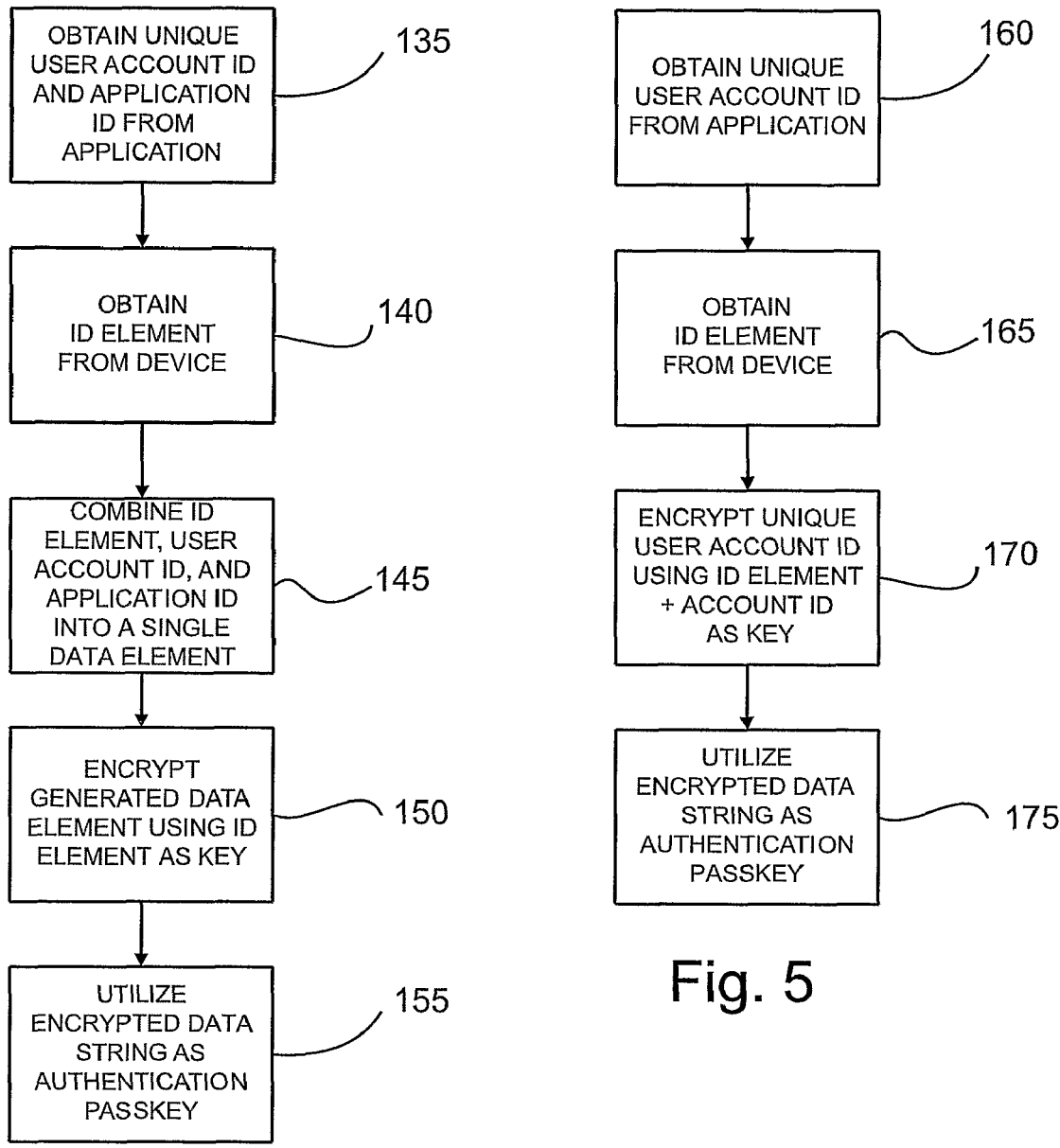

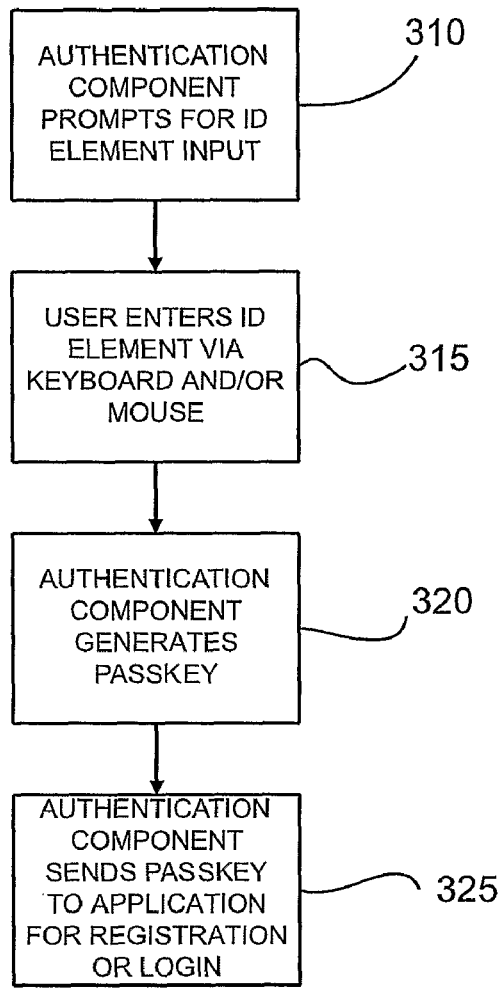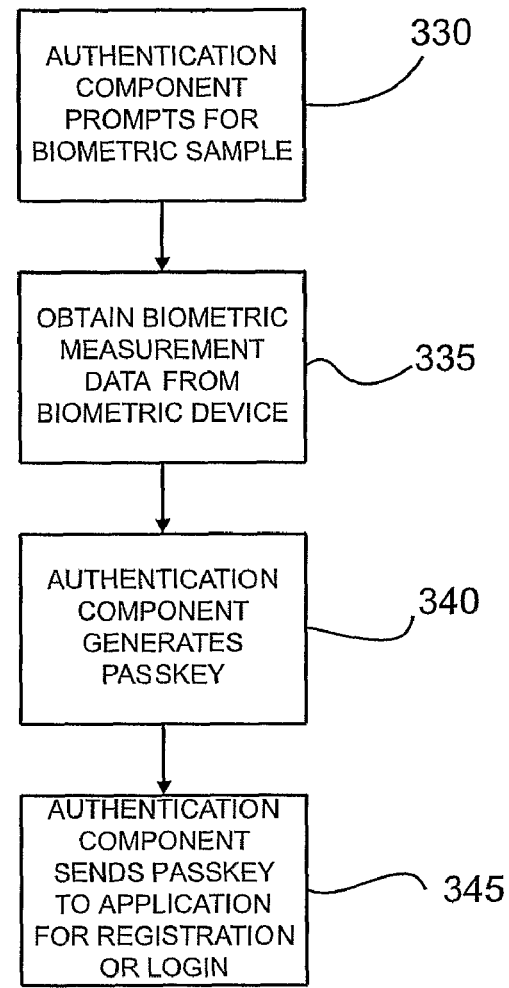
Fig. 11
Fig. 12

METHODS FOR AUTHENTICATION

CROSS-REFERENCE TO RELATED APPLICATIONS

This application claims priority to U.S. provisional application Ser. No. 60/646,048, filed on Jan. 21, 2005, the contents of which are incorporated herein in their entirety.

TECHNICAL FIELD

The present invention relates generally to a method for controlling access to data and more specifically to a method that utilizes various authentication functions for controlling access to data.

BACKGROUND

With the increasing use of computer systems and the Internet to transact business and store sensitive information, data security has become a source of increased concern to the public. This source of concern has originated from the growing onslaught of computer and Internet crimes by unauthorized users gaining entry to these systems. In response, designers have developed various methods and systems, including software application security programs, to prevent unauthorized access to computer systems.

The primary objective of software application security programs is to prevent unauthorized access to application data and transactions. Typical applications are developed and implemented such that multiple security measures are included within the application software and also the enabling infrastructure.

One security method employed by applications is based on user authentication. User authentication requires a person or software application requesting access to an application or data to provide one or more access codes; the most prevalent being a username/password combination. The biggest security weakness in computer networks is poor password selection. In many organizations, employees have to remember between five (5) and ten (10) passwords, and have to change them as frequently as every thirty (30) days. Remembering passwords is a problem, and it is said by some that up to twenty (20) percent of helpdesk calls are password-related.

Many users try to choose the same username and password for all the computer resources (hardware or software), applications or data sources (collectively, systems) they need to access. This synchronization of passwords is often not possible, because different systems might have different and conflicting password construction rules. Also, usernames have to be unique within each system, and this puts further constraints on users who might be using systems administered by outside agencies or business partners, as well as their own company's internal systems. Even if multiple systems permit the use of the same username and password, the breach of one system and resulting awareness of the username and password simplifies the ability to breach other systems using the same sign-on designations.

As a result, users must manage an overwhelming number of username and password combinations. This leads to poor security as users choose obvious passwords to make them memorable. It also leads to users forgetting passwords—a time-consuming problem for the parties involved. Alternatively, usernames and passwords may be written down, providing a ready opportunity for theft and usage under appropriate conditions.

Accordingly, there is a need to to simplify the sign-on process, using a single, convenient authentication system and methodology that is equally applicable across all systems or applications that a user may wish to access.

BRIEF DESCRIPTION OF THE DRAWINGS

These and other features of the present invention are more fully set forth in the following description of exemplary embodiments. The description is presented with reference to the accompanying drawings in which:

FIG. 4 is a flow chart of the process of an exemplary embodiment for creating a generated authentication passkey using an ID element, a unique user account identifier and a unique software application identifier for a software application;

FIG. 5 is a flow chart of the process of an exemplary embodiment for creating a generated authentication passkey using a unique user account identifier for a software application by utilizing an ID element in combination with an account ID as an encryption key;

FIG. 11 is a flow chart of the process of an exemplary embodiment utilizing interactive user input via computer keyboard and/or mouse to provide an ID element for passkey generation;

FIG. 12 is a flow chart of the process of an exemplary embodiment utilizing a biometric device to provide an ID element for passkey generation;

DETAILED DESCRIPTION

Authentication capabilities are disclosed such as for use with a wide variety of software applications utilizing a variety of input, storage, and measurement devices. It will be understood by someone with ordinary skill in the art, however, that the teachings herein are merely representative and do not preclude implementation in various other forms and with other existing and future devices, encryption methods, and unique user and application identifiers without departing from the spirit of the present invention. Accordingly, the types of encryption methods, selected user and application identifier strings, and devices described herein are not intended to be limiting, but rather are to be representative and illustrative.

Figure 1:
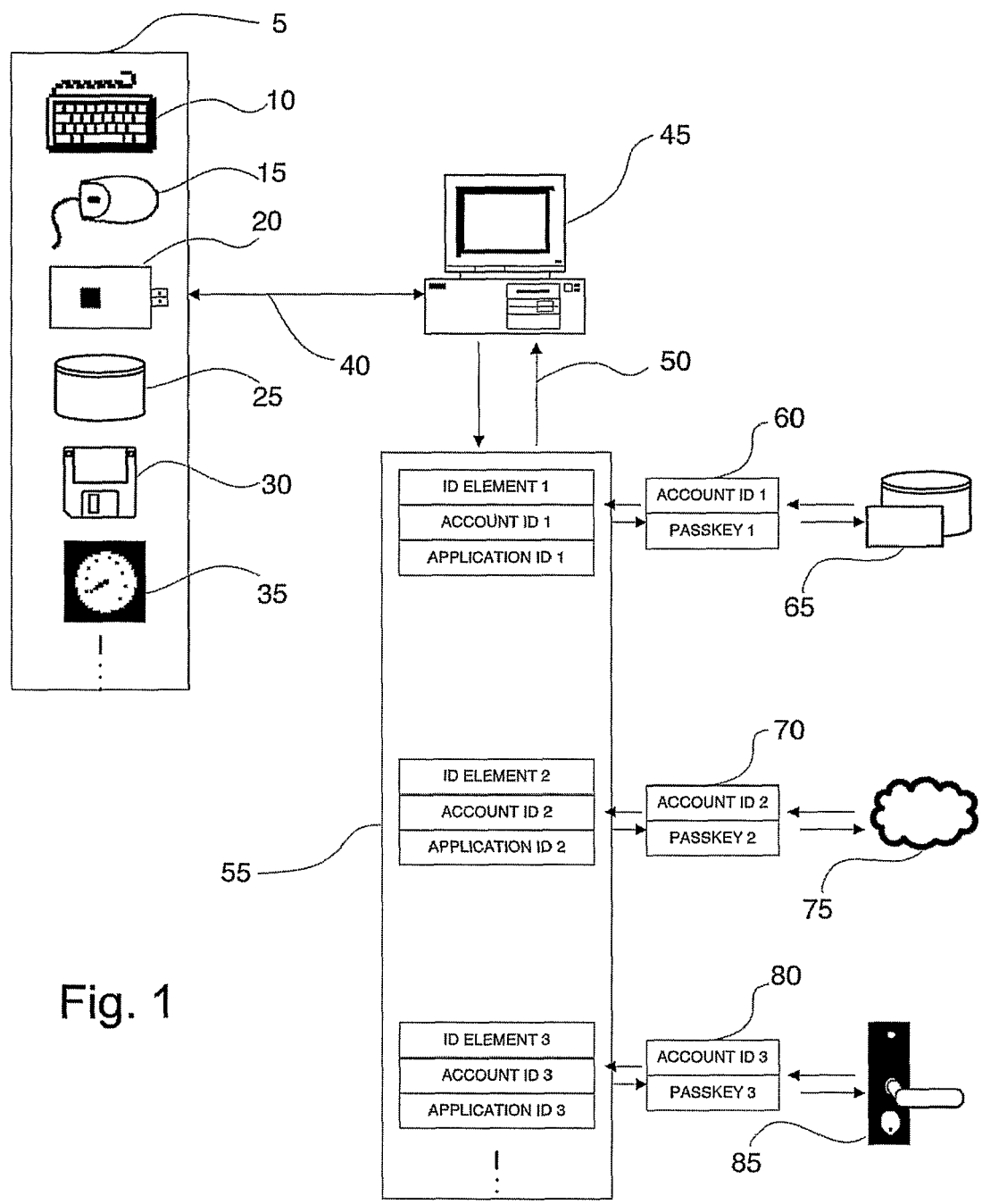
FIG. 1 is a graphic representation of a computer system connected to a variety of devices and integrated with a variety of software applications for authentication in an exemplary embodiment.

FIG. 1 is a graphic representation of a computer 45 connected to a variety of input, storage, and measurement devices 5 and a variety of applications in an exemplary embodiment. The computer 45 is of the traditional type including Read only Memory (ROM), Random Access Memory (RAM), a processor, etc. The input devices 5 individually include a mechanism 40 for communicating with the host computer system 45. The mechanism 40, through which each individual input device 5 and computer 45 communicate, may be a wire or wireless connection. The computer 45 and input devices 5 contain operating systems, device drivers, application software, storage capacity, and databases with which to operate in accordance to disclosed teachings.

The computer 45 may be any computing device running any operating system, examples of which include but are not limited to: standard Personal Computer (PC) desktops, laptops and notebooks, mini computers, mainframe computers, multiprocessor computers, network servers, network appliances such as routers and switches, cellular and wireless phones, personal digital assistant (PDA), or embedded computer.

Viable input devices 5 could include, without being limited to, a computer keyboard 10 or other variation of typed or key press device, mouse 15 or similar pointing and selection device, biometric device 20, fixed storage 25 device, removable storage 30 device, or any measurement device 35 capable of delivering input data as disclosed herein.

It will also be understood by someone with ordinary skill in the art that these input devices 5, and any other input devices could be utilized in combination with each other to deliver input data as discussed in more below. For example, when a user wishes to register their biometric authentication key with a resource such as a software application, or access the software application, or authenticate use of a sub function of the software application, they are prompted by an authentication component 55 to authenticate using the biometric device 20. In the exemplary embodiment of FIG. 1, two-way communication 50 is illustrated between computer 45 and component 55, as discussed in greater detail below.

When the user utilizes the device 20 in the proper manner, a biometric template will be provided to the authentication component 55 according to the method of the biometric hardware and software solution. This biometric template is a digital representation of the biometric characteristics measured by the device.

Figure 7:
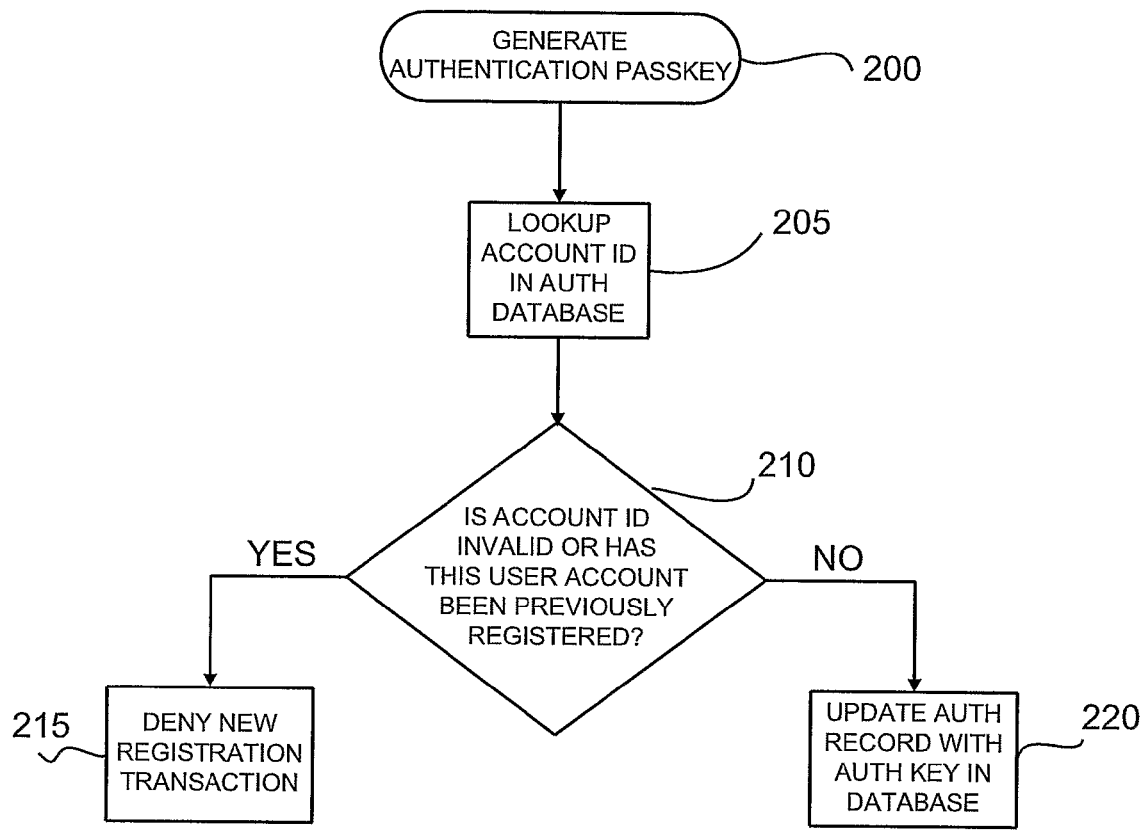
FIG. 7 is a flow chart of the process of an exemplary embodiment for registering an authentication passkey with a software application.
Figure 9:
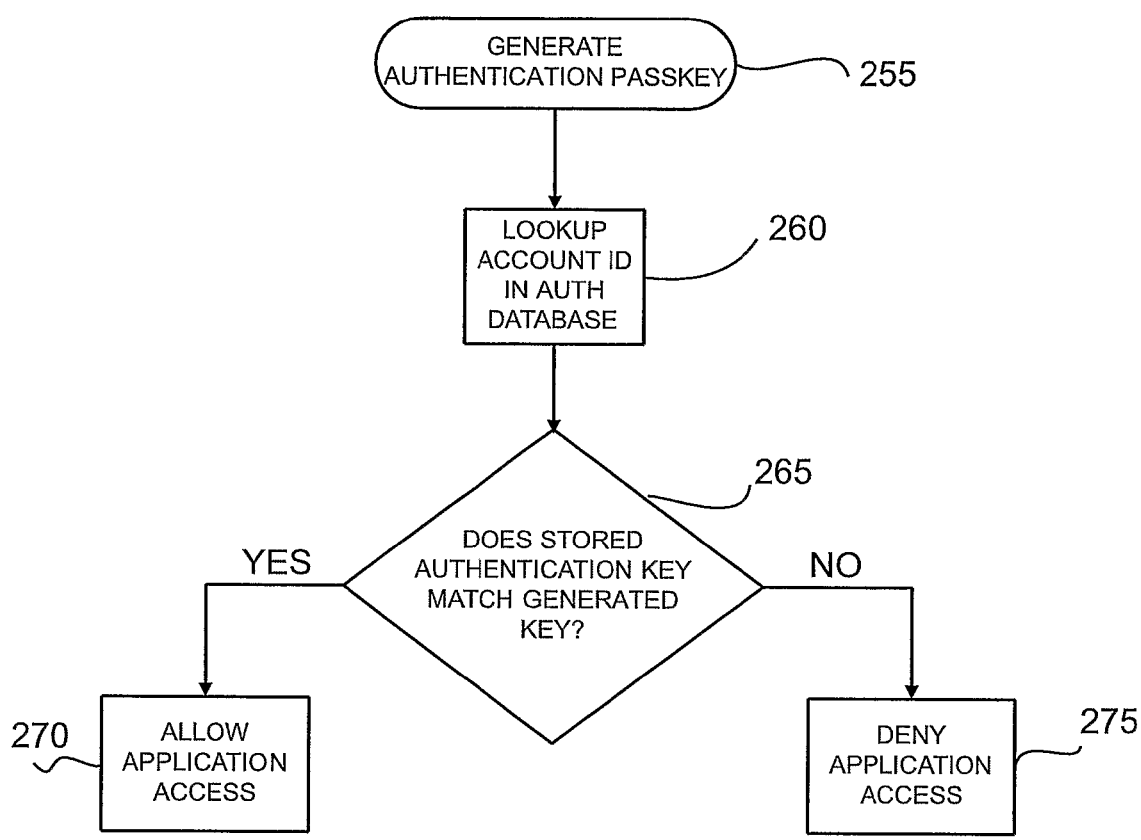
FIG. 9 is a flow chart of the process of an exemplary embodiment for authenticating a user with an authentication passkey.

As will be described in further detail herein, the authentication component 55 generates an authentication key and generates a registration or authentication transaction with the resource. FIGS. 7 and 9, respectively illustrate exemplary embodiments of the registration and authentication transaction.

The biometric authentication key is dynamically generated at the time of the biometric measurement provided by the device 20, and the biometric template is typically not provided to the software application. A biometric device 20 may be combined with removable storage 30 in order that all or part of the software to carry out the teachings herein may be stored and executed from the combined device. Also, for example, outputs from multiple input devices such as keyboard 10 and mouse 15 may be combined to produce input data. Further, an input device 5 may be embedded into the computer system 45 or may contain a complete embedded computer system in which to operate.

The computer system 45, utilizes authentication component 55, which is executed either from internal, external, network, or removable storage. The authentication component 55 is integrated with one or more local executing applications 65, remote executing or client-server applications 75, or other properly connected wired or wireless devices 85 which are able to be controlled via application software, operating system functions, or devices drivers.

The authentication component 55 may be implemented within a stand alone application separate from the operating system and separate from any integrated software applications. Furthermore, the authentication component 55 can be embedded as a capability of an operating system or within any application providing functions beyond authentication.

The integration method for each application may vary according to the nature of the application and its configuration in respect to the authentication component 55. For example an application running locally 65 on the computer 45 may require one form of integration 60, whereas a remote network or client-server executing application 75 may require another form of integration 70, and another application 85 connected via wire or wirelessly may require yet another form of integration 80. In any integration configuration including but not limited to 60, 70, 80, a unidirectional data passing mechanism must be provided in order to enable use of the authentication component 55.

A bidirectional data passing mechanism can also be used which would typically provide greater user convenience and may increase the security of the integration by removing the user element.

The authentication component 55, will store required application authentication data elements, an application account identifier and application identifier, within the internal file storage of the computer 45, on network available file storage, or on fixed external storage 25 or removable storage 30.

The application authentication data elements may be stored separately from the location of the authentication component 55. Alternatively, the application authentication data elements may be stored within and accessed via a database application executing either locally or on a remote processor or computer.

The authentication component 55 can be configured with and integrated with a great variety of software and operating system entities, considered herein as applications. Application software may consist of an entire executable software program, or its sub elements such as Component Object Model (COM) interfaces, or dynamic link libraries, including both locally stored and executed and remotely stored and/or executed elements. Application entities may also include databases, local and remote operating system processes, including process sub elements such as threads. In batch processing, parallel processing, processing farms, network linked distributed processing systems, the authentication component may be integrated at one or many points within the context of an application.

The authentication component 55 may be integrated in various ways to provide an authentication function for resources such as software applications. For example, the integration may be such that the authentication component 55 enters a username and password into an application authentication prompt, which would be generally considered a loose integration because the application itself was not modified to support the authentication, and an application authentication application programming interface (API) was not used to integrate the invention.

In other integrations between the authentication component 55 and software applications, what would generally be considered tight integration could be utilized. Tight integration would allow the authentication component 55 to communicate the authentication transaction directly to the application program via code within the application designed for such communication, or via supplemental code typically called an application programmer interface (API) which is designed to accommodate external authentication methods for the application.

Figure 2:
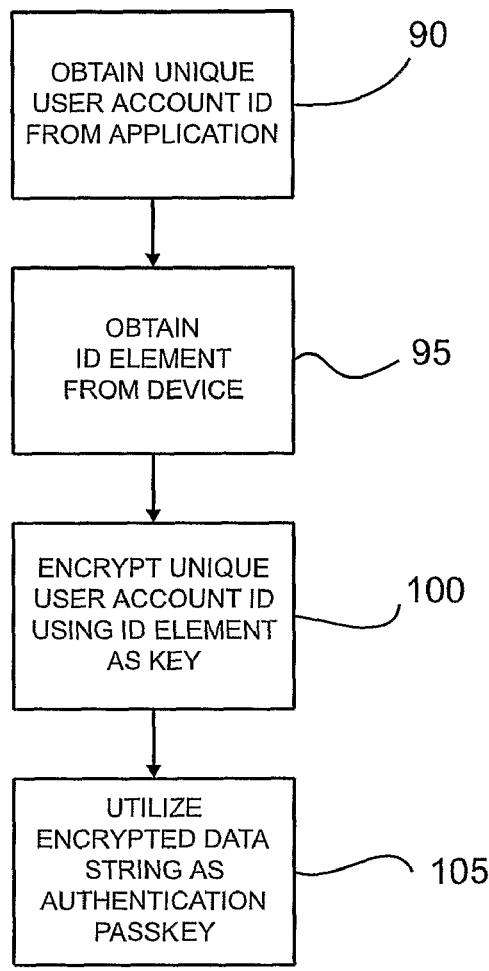
FIG. 2 is a flow chart of the process of an exemplary embodiment for creating a generated authentication passkey using a unique user account identifier for a software application.

FIG. 2 is a flow chart of the process of creating a generated authentication passkey for a software application using a unique user account identifier in an exemplary embodiment.

A user may be a actual person interacting with a computer, or a software programming running in a local or remote context, or a local or remote operating system process or sub component such as a process thread. Therefore a user as described in embodiments herein may be any of these or similar entities.

At a step 90, the authentication component 55 will be provided a unique user account identifier for the resource, (e.g., software application) for which the user requires access. The user account identifier may be provided by the end user typing or otherwise entering the information or through some automated or integrated mechanism between the application and the authentication component.

At a step 95, a device, for example a computer keyboard, or storage device, or other devices as further detailed in FIG. 1, and further detailed in FIGS. 11, 12, 13, 14, 15, and 16, and its associated hardware drivers, software, application programming interface, or other mechanism will provide an identifying data element (ID element).

The ID element may be provided by any type of standard input, biometric, operating system or program entity, storage device, computer system component, or measurement device, as described in FIG. 1, and further detailed in FIGS. 11, 12, 13, 14, 15, and 16. Therefore a device as described in embodiments herein may be any of these or similar entities.

The ID element may consist of a combination of data from devices such that if the same data is presented by each device it will consistently produce the same ID element.

ID element data collected from one or more devices may be manipulated in a variety of ways including but not limited to applying mathematical manipulations, or combining any number of fixed or variable data elements. In order to support repeatable authenticated sessions these manipulations and combinations must be applied such that they can be repeated with the same result in future sessions. The result of any manipulations would be considered the final ID element.

The user account identifier is encrypted at a step 100, using the ID element as the key to the encryption. It is recognized that virtually any encryption technology chosen in the specific implementation may be used. The encryption method delivers a unique encrypted output for any user account identifier and template key combination provided. The encryption method may be predetermined within the authentication component of the invention, or it may be selectable by the user, or otherwise selected at run time by parameter sent to the authentication component from an application.

Many cryptography methods exist which are commonly referred to as encryption, but which can range from simple substitution ciphers to private key encryption to public-private key based encryption. Choice of encryption method is only relevant in that the method must provide consistent output given the same key and data elements, and that the resulting output of the encryption provide a useful passkey which will vary a significant amount given different key and data elements.

Manipulation of the key or data elements prior to encryption may be utilized as necessary, with proper consideration of repeatability of the encryption output under the desired circumstances.

At step 105, the authentication component utilizes the encrypted data string to provide a unique, repeatable passkey which can be generated dynamically for authentication purposes to a resource such as an application.

Due to the construction of the passkey via encryption of the user account ID provided by the application, this passkey can be unique to the user account ID when proper selection of the encryption method and ID element source are provided.

Unlike conventional authentication systems, the embodiments described herein do not require providing the ID element, typically called a password, to the software application for authentication thereby reducing the data security risks. Instead, the ID element, if discovered by itself or even in combination with the user account ID, is not a security threat due to the other unknown elements including encryption elements and parameters.

Based on selection of ID element devices and their configuration, along with the encryption method selection and parameters such as key length and bit level, the output may vary in size, or in the case of a hash type of encryption method, would produce a consistent length output. The combined choices for encryption type, settings, and encryption elements can be adjusted to meet the restrictions of the application in which authentication is to be provided. Example restrictions may include minimum and maximum authentication passkey length and supported character set.

It will be appreciated that manipulation of the encrypted data may be necessary to provide a useful and secure passkey for authentication to an application. Example manipulations include truncation, expansion of passkey through mathematical means, combining with a fixed or variable data elements, character set change, conversion from alphanumeric to numeric or the reverse, or converting to hexadecimal representation. When manipulating encrypted data, consideration should be made as to repeatability of the manipulations to ensure repeatable authentication sessions if necessary. The result of any manipulations would be considered the final authentication passkey.

Various embodiments may employ differing data element constructions and differing encryption key constructions in order to generate an authentication passkey. Examples of specific embodiments are included herein as FIGS. 3, 4, 5, and 6. These embodiments are not to be interpreted as limiting.

Figure 3:
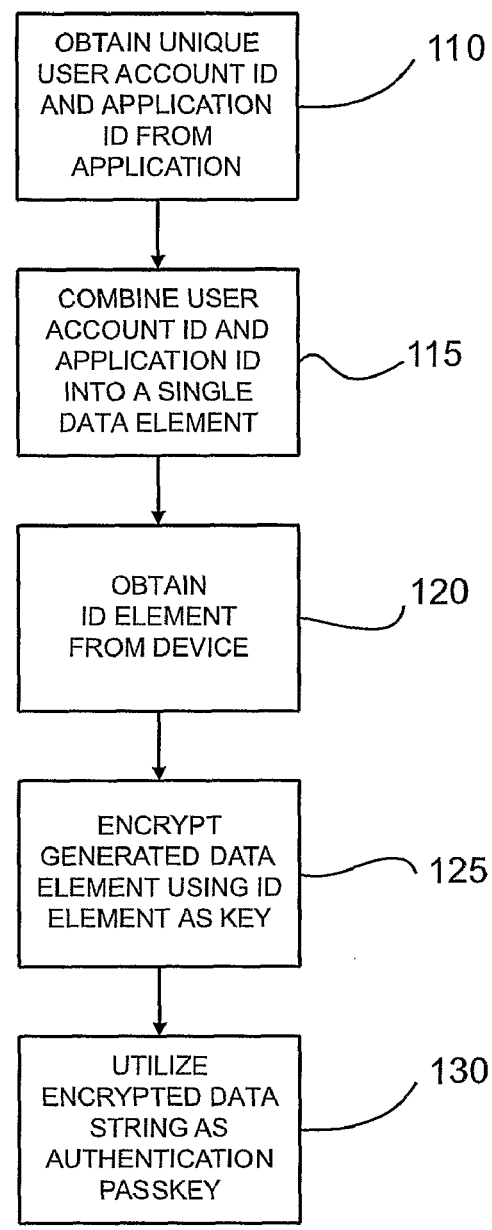
FIG. 3 is a flow chart of the process of an exemplary embodiment for creating a generated authentication passkey using a unique user account identifier combined with a unique software application identifier for a software application.

FIG. 3 is a flow chart of an exemplary embodiment showing an alternative process of creating an authentication passkey for a resource such as a software application using a unique user account identifier combined with a unique software application identifier.

At a step 110, the authentication component will be provided a unique user account identifier for the software application in which the user requires access. The component will also be provided an additional application identifier. The application identifier reduces the chance that the user account identifier alone may be offered by another software application, thereby yielding the same generated authentication key. Higher security is achieved when the application identifier can be guaranteed to be unique. As an example, a web URL is guaranteed to be unique on the public internet making it a strong choice for application identifier.

The user account identifier and application identifier are combined into a single data element at a step 115. In some embodiments the single data element may be a string variable.

It will be appreciated that manipulation of the individual data elements, or manipulating the resulting combined data element may occur in a number of ways including, but not limited to applying mathematical manipulations, or combining any number of fixed or variable data elements. In order to support repeatable authenticated sessions these manipulations and combinations must be applied such that they can be repeated with the same result in future sessions. The result of any manipulations would be considered the final data element.

At a step 120, a device and its associated hardware drivers, software, application programming interface, or other mechanism will provide an ID element.

The combined user account identifier and application identifier data element is encrypted at a step 125, using the ID element as the key to the encryption. It is recognized that any encryption technology may be utilized depending upon the specific implementation. The encryption method is required to deliver a unique encrypted output for any data element and template key combination provided.

At a step 130, the unique encryption is utilized by the authentication component to provide a unique, repeatable passkey that can be generated dynamically for authentication purposes.

FIG. 4 is a flow chart of an alternative exemplary embodiment illustrating the process of creating an authentication passkey for a resource such as a software application using a unique user account identifier and a unique software application identifier combined with an ID element.

At a step 135, the authentication component will be provided a unique user account identifier for the software application in which the user requires access. The component will also be provided an additional application identifier. The application identifier will reduce the chance that the user account identifier alone may be offered by another software application, thereby yielding the same generated authentication key. Higher security is achieved when the application identifier can be guaranteed unique. As an example a web URL is guaranteed to be unique on the public Internet, making it a strong choice for the application identifier.

At a step 140, a device and its associated hardware drivers, software, application programming interface, or other mechanism will provide an ID element.

The ID element, user account identifier, and application identifier are combined into a single data element at a step 145. In some embodiments, the single data element may be a string variable.

The combined data element is encrypted at a step 150, using the ID element as the key to the encryption. It is recognized that any encryption technology may be utilized depending upon the specific implementation. The encryption method is required to deliver a unique encrypted output for any data element and template key combination provided.

At a step 155, the unique encryption is utilized by the authentication component to provide a unique, repeatable passkey that can be generated dynamically for authentication purposes.

FIG. 5 is a flow chart of an alternative process of creating an authentication passkey for a resource such as a software application using an encryption key containing an ID element and application account identifier.

At a step 160, the authentication component will be provided a unique user account identifier for the software application in which the user requires access.

At a step 165, a device and its associated hardware drivers, software, application programming interface, or other mechanism will provide an ID element.

The user account identifier is encrypted at a step 170, using the ID element in combination with the user account identifier as the key to the encryption. It is recognized that any encryption technology may be utilized depending upon the specific implementation. The encryption method is required to deliver a unique encrypted output for any data element and template key combination provided.

At a step 175, the unique encryption is utilized by the authentication component to provide a unique, repeatable passkey that can be generated dynamically for authentication purposes.

Figure 6:
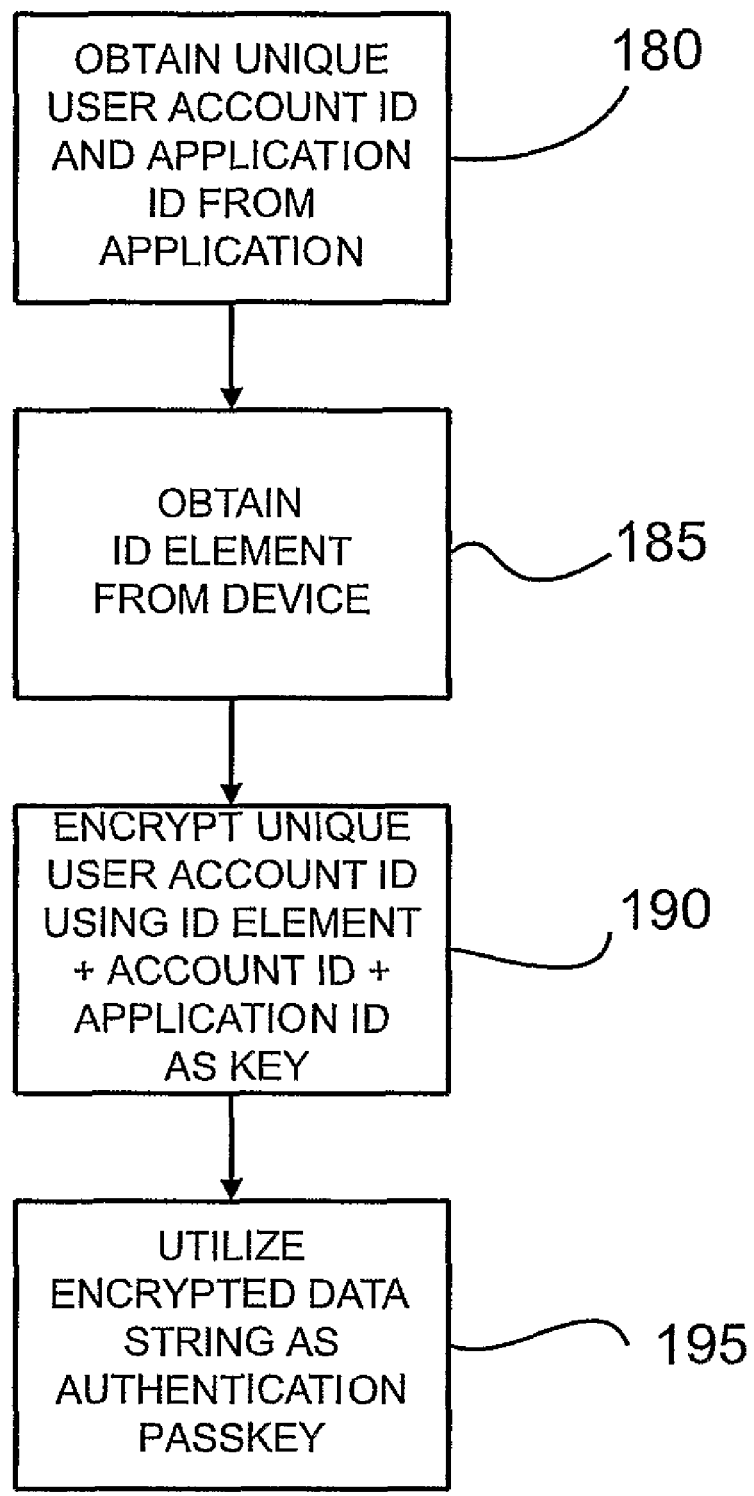
FIG. 6 is a flow chart of the process of an exemplary embodiment for creating a generated authentication passkey using a unique user account identifier for a software application by utilizing an ID element in combination with an account ID and a unique application ID as an encryption key.

FIG. 6 is a flow chart of an alternative process of creating an authentication passkey for a resource such as a software application using an encryption key containing an ID element, user account identifier, and application identifier.

At a step 180, the authentication component will be provided a unique user account identifier and an application identifier for the software application in which the user requires access.

At a step 185, a device and its associated hardware drivers, software, application programming interface, or other mechanism will provide an ID element.

The user account identifier is encrypted at a step 190 using the ID element in combination with the user account identifier and the application identifier as the key to the encryption. It is recognized that any encryption technology may be utilized depending upon the specific implementation. The encryption method is required to deliver a unique encrypted output for any data element and template key combination provided.

At a step 195, the unique encryption is utilized by the authentication component to provide a unique, repeatable passkey that can be generated dynamically for authentication purposes.

FIG. 7 is a flow chart of the process of registering an authentication passkey with an application.

It will be appreciated that an application may be an interactive user program, a sub component of such a program, a batch processed program, an operating system or sub component such as a process or process thread, any of which may be running in a local or remote context. Therefore, an application as described in embodiments herein may be any of these or similar entities.

At a step 200, an authentication passkey is generated by the authentication component as described in FIGS. 2, 3, 4, 5, and 6.

The application is provided a user account identifier and generated passkey as the registration transaction. The communication method between the authentication component and the application will vary based on how integrated the authentication component of the invention is with an application in a particular implementation. Example communication methods for the authentication transaction include, but are not limited to: simulation of keystrokes within an application's user login prompt or direct passing of authentication data elements through an application programming interface (API) which the application provides for automated authentication transactions.

It will be appreciated that authentication transactions as generated by the authentication component of the invention may occur within a single program application when the authentication component is embedded in the application, between programs and processes on the same computer using any available inter-process communication method, or between two or more computers where applications are distributed.

The application accesses its authorization database 205 in order to locate a record with a matching account identifier as provided by the authentication component.

If the account identifier is not located in the authentication database or the account has already been processed with a registration transaction 210, then the registration transaction is denied 215.

Otherwise, the registration transaction is processed 220 by updating the application authentication database to contain the authentication passkey for the user account identifier related record and the record is also marked as registered to prevent future registration transactions.

An application authorization database may take the form of any variety of entities and access methods. Examples include a single purpose data file specifically for the application, or a database or database table specifically for the application, or a shared authentication database, or an operating system authentication database. Therefore, an application authentication database as described in embodiments herein may be any of these or similar entities.

Figure 8:
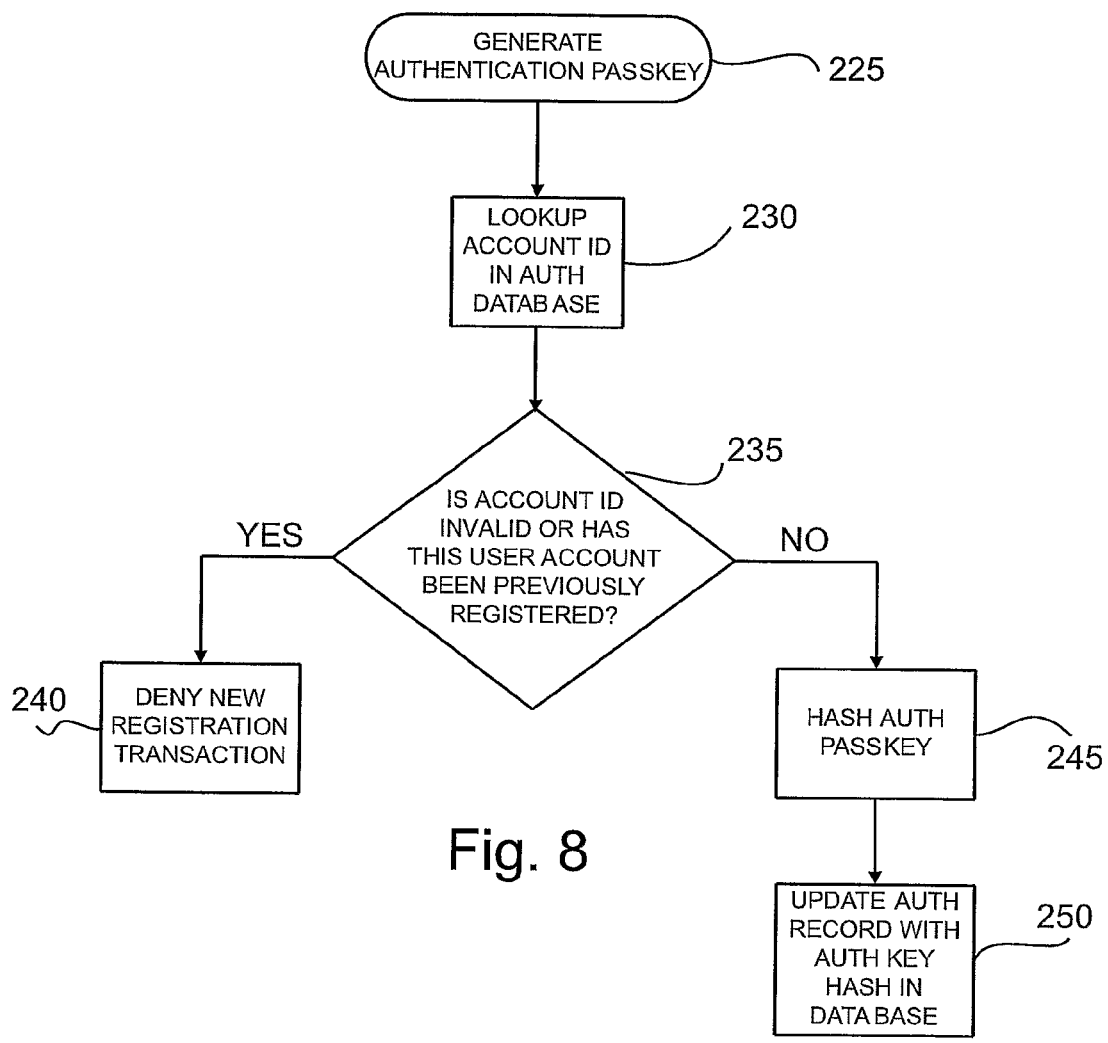
FIG. 8 is a flow chart of the process of an exemplary embodiment of the present invention for registering an authentication passkey with a software application whereas the application stores a hash of the passkey.

FIG. 8 is a flow chart of the process of registering an authentication passkey with an application by storing the hash of the passkey.

At a step 225, an authentication passkey is generated by the authentication component as described in FIGS. 2, 3, 4, 5, and 6.

The application is provided a user account identifier and generated passkey as the registration transaction.

The application accesses its authorization database 230 in order to locate a record with a matching account identifier as provided by the authentication component.

If the account identifier is not located in the authentication database or the account has already been processed with a registration transaction 235, then the registration transaction is denied 240.

Otherwise, the passkey is processed by a hash encryption 245 and the registration transaction is processed 250 by updating the application authentication database to contain the hash of the authentication passkey for the user account identifier related record and the record is also marked as registered to prevent future registration transactions.

FIG. 9 is a flow chart of the process of authenticating a user application session utilizing a generated authentication passkey in an exemplary embodiment.

At a step 255, an authentication passkey is generated by the authentication component as described in FIGS. 2, 3, 4, 5, and 6.

At a step 260, a user account identifier and the authentication passkey are both provided to the software application, which queries an application authentication database.

If the account identifier record is not located in the database, the authentication transaction is rejected. If the account identifier record is located in the database, the current authentication passkey is validated against the one stored for this record at a step 265. If the current authentication passkey matches the key stored for the user account identifier, the user is granted access to the software application at a step 270.

If the current authentication passkey does not match the passkey stored for the user account identifier or if the account has not yet recorded an authentication passkey registration, the user is denied access to the software application at a step 275.

Figure 10:
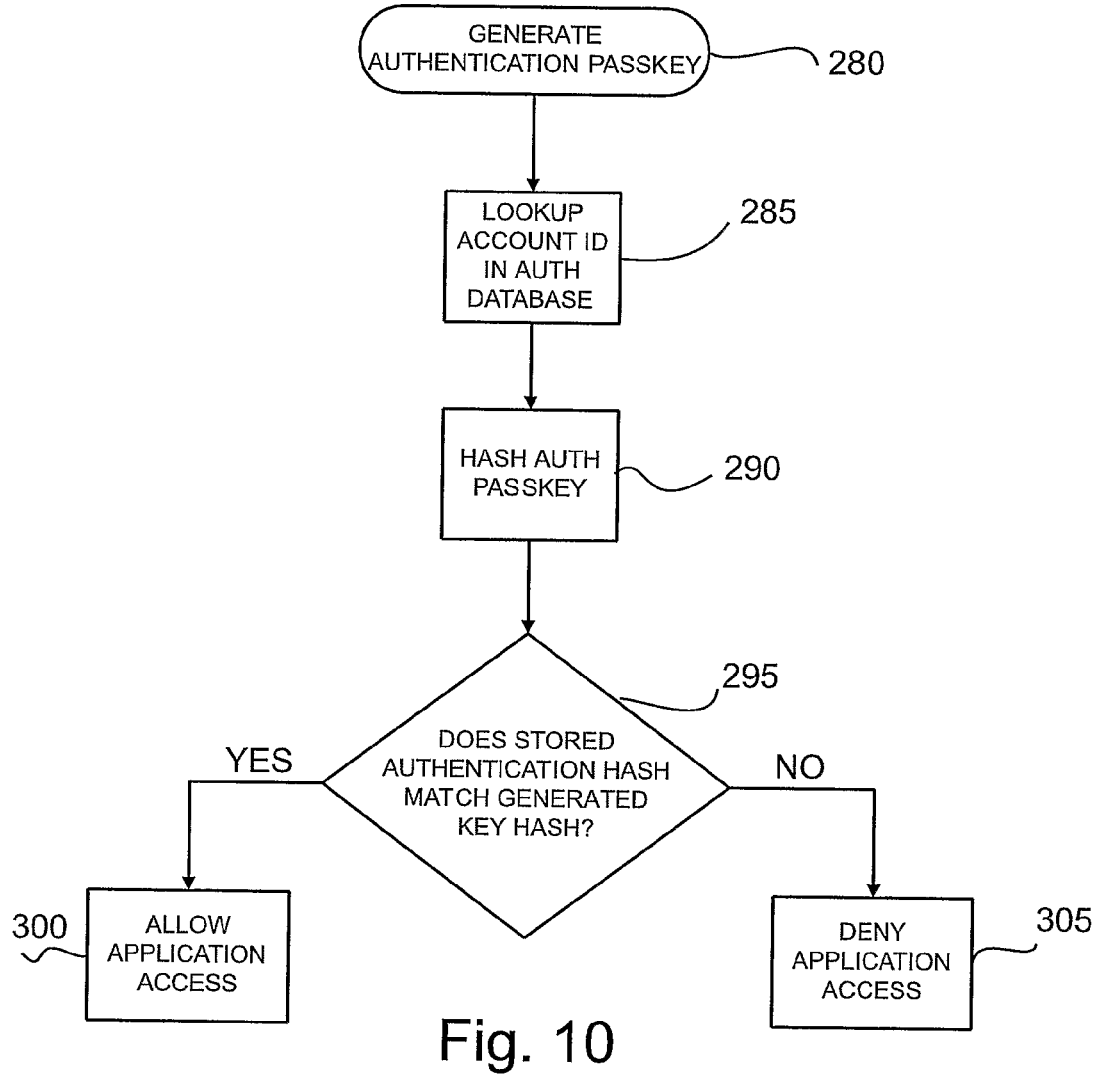
FIG. 10 is a flow chart of the process of an exemplary embodiment for authenticating a user with an authentication passkey whereas the application compares a hash of the presented passkey to the stored hash of the originally registered passkey.

FIG. 10 is a flow chart of the process of authenticating a user application session utilizing a hash of a generated authentication passkey in an exemplary embodiment.

At a step 280, an authentication passkey is generated by the authentication component as described in FIGS. 2, 3, 4, 5, and 6.

At a step 285, a user account identifier and the authentication passkey are both provided to the software application, which queries an application authentication database.

If the account identifier record is not located in the database, the registration transaction is rejected. If the account identifier record is located in the database, the current authentication passkey is processed by a hash encryption 290.

The result of the hash encryption is validated against the one stored for this record at a step 295. If the current passkey hash matches the hash stored for the user account identifier, the user is granted access to the software application at a step 300.

If the current authentication passkey hash does not match the hash stored for the user account identifier or if the account has not yet recorded an authentication passkey hash registration, the user is denied access to the software application at a step 305.

FIG. 11 is a flow chart of the process of providing an ID element to the authentication component utilizing a computer keyboard and/or mouse in an exemplary embodiment.

At a step 310, the authentication component prompts a user for ID element input.

The user enters an ID element by typing on the keyboard and/or selecting on screen entries using a mouse 315.

At a step 320, an authentication passkey is generated by the authentication component as described in FIGS. 2, 3, 4, 5, and 6.

The authentication component sends the authentication transaction 325 as described in FIGS. 9 and 10.

FIG. 12 is a flow chart of the process of providing an ID element to the authentication component utilizing a biometric device in an exemplary embodiment.

At a step 330, the authentication component prompts a user for ID element input.

The user interacts as required with a biometric device to provide an ID element 335.

At a step 340, an authentication passkey is generated by the authentication component as described in FIGS. 2, 3, 4, 5, and 6.

The authentication component sends the authentication transaction 345 as described in FIGS. 9 and 10.

Unlike other authentication solutions, sensitive biometric data is not required to be stored by the application for verification in authentication sessions. Instead the biometric data is used to generate the authentication passkey for each authentication transaction.

Figure 13:
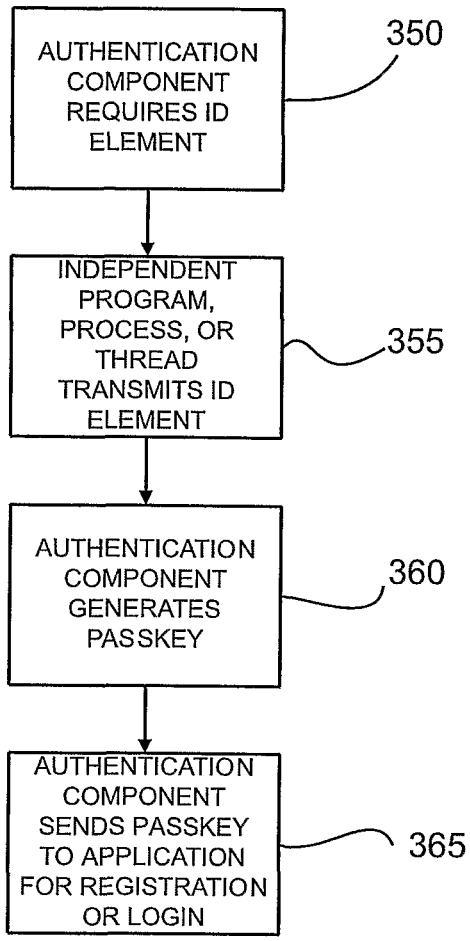
FIG. 13 is a flow chart of the process of an exemplary embodiment utilizing a separate program, process, or process thread to provide an ID element for passkey generation.

FIG. 13 is a flow chart of the process of providing an ID element to the authentication component utilizing data from an independent program, process, or sub process element in an exemplary embodiment.

At a step 350, the authentication component requires an ID element input for an authentication transaction.

An independent software program, process, or process component such as a thread, transmits an ID element 355.

At a step 360, an authentication passkey is generated by the authentication component as described in FIGS. 2, 3, 4, 5, and 6.

The authentication component sends the authentication transaction 365 as described in FIGS. 9 and 10.

Figure 14:
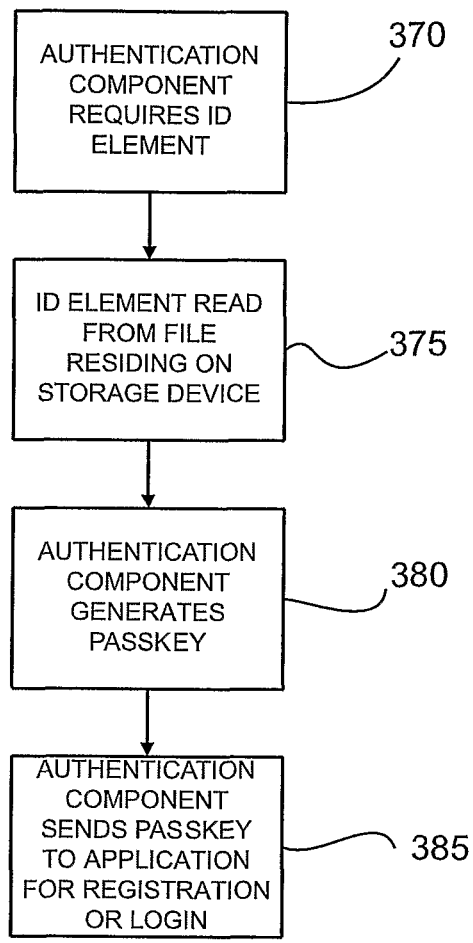
FIG. 14 is a flow chart of the process of an exemplary embodiment utilizing a file storage device to provide an ID element for passkey generation.

FIG. 14 is a flow chart of the process of providing an ID element to the authentication component utilizing a file located on a storage device in an exemplary embodiment.

At a step 370, the authentication component requires an ID element input for an authentication transaction.

The authentication component accesses a file located on a file storage device and reads ID element data 375. The file storage device may be internal to the computer, an externally connected device, a network device or server, or removable media.

At a step 380, an authentication passkey is generated by the authentication component as described in FIGS. 2, 3, 4, 5, and 6.

The authentication component sends the authentication transaction 385 as described in FIGS. 9 and 10.

Figures 15, 16:
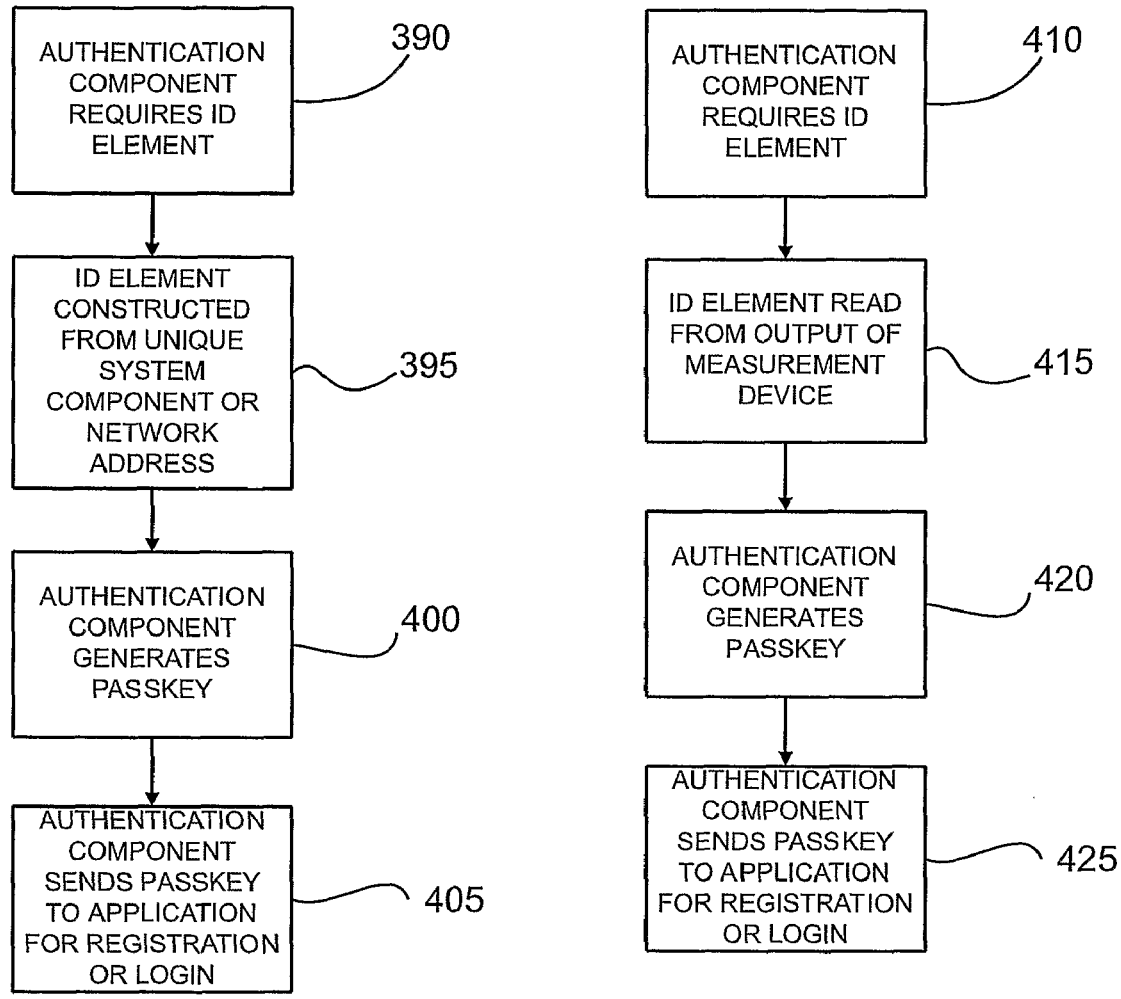
FIG. 15 is a flow chart of the process of an exemplary embodiment of the utilizing a unique system component or network address to provide an ID element for passkey generation.
FIG. 16 is a flow chart of the process of an exemplary embodiment utilizing a digital or analog measurement device to provide an ID element for passkey generation.

FIG. 15 is a flow chart of the process of providing an ID element to the authentication component utilizing a value provided by a computer system component or network address in an exemplary embodiment.

At a step 390, the authentication component requires an ID element input for an authentication transaction.

The authentication component accesses a system component identifier or networking address and reads ID element data 395. The system component may be any internal or attached component which can deliver a unique identifier. A network card MAC address or higher level protocol address may also be used.

At a step 400, an authentication passkey is generated by the authentication component as described in FIGS. 2, 3, 4, 5, and 6.

The authentication component sends the authentication transaction 405 as described in FIGS. 9 and 10.

FIG. 16 is a flow chart of the process of providing an ID element to the authentication component utilizing a value provided by a measurement device in an exemplary embodiment. A measurement device may consist of any simple or complex mechanism that can communicate via wire or wireless transmission to the computer and provide a value representing a measurement of any type. Examples of measurements in which usable devices exist include but are not limited to: temperature, pressure, color, light, flow, power consumption, DNA, spectrum, etc.

At a step 410, the authentication component requires an ID element input for an authentication transaction.

The authentication component accesses a measurement device and reads ID element data 415.

At a step 420, an authentication passkey is generated by the authentication component as described in FIGS. 2, 3, 4, 5, and 6.

The authentication component sends the authentication transaction 425 as described in FIGS. 9 and 10.

Figure 17:
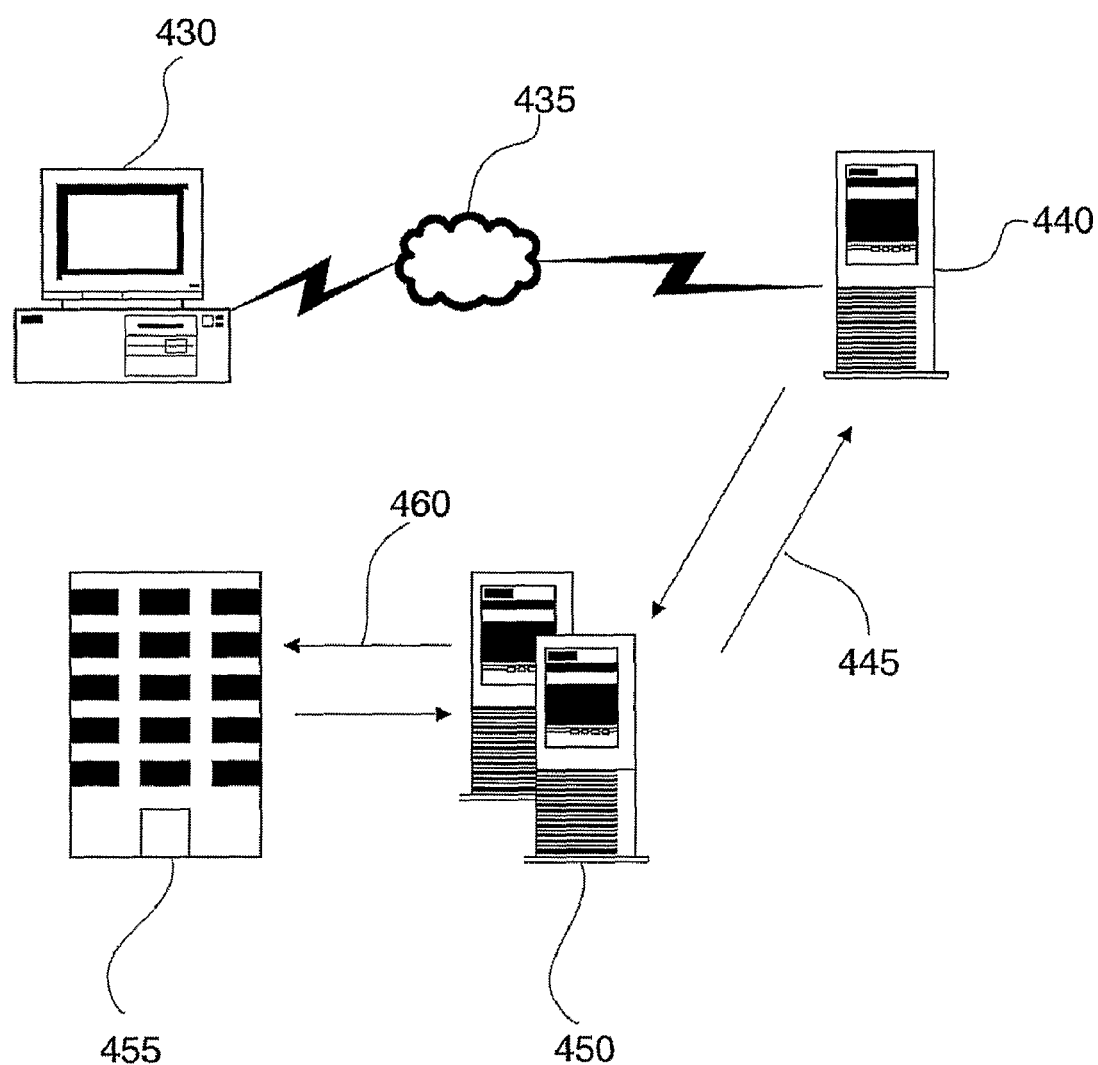
FIG. 17 is a graphic representation of a payment processing system connected to a web site merchant application and an offline merchant in an exemplary embodiment.

FIG. 17 is a graphic representation of a payment processing system in which a payment processing computers 450 are connected to a web site merchant application 440 and an offline merchant 455 in an exemplary embodiment. A user computer 430 is connected to the Internet 435, or another public or private network such that it can communicate using a web browser to the merchant web site computer 440. The merchant web site 440 is itself connected to the payment processing system computers 450 utilizing a networked connection 445, which may be the public Internet, a private network connection, or other shared or public connection providing communication. An offline merchant 455 may also be connected to the payment processing computers 450 utilizing a similar 460 public Internet or private, or shared networking connection. Either offline or online merchant system will have the capability to authorize and approve or deny customer payment transactions employing a payment passkey (paykey).

The payment system 450 may consist of one or many computers operating to provide the required capacity and reliability of a payment system.

It will be appreciated that the transaction ability between a web merchant system 440 and the payment processing system or between an offline merchant system 455 and the payment processing system 450 may be completely automated and integrated, partially automated and integrated, or that payment transactions are wholly manual and processed by users assigned to such tasks.

Figures 18, 19:
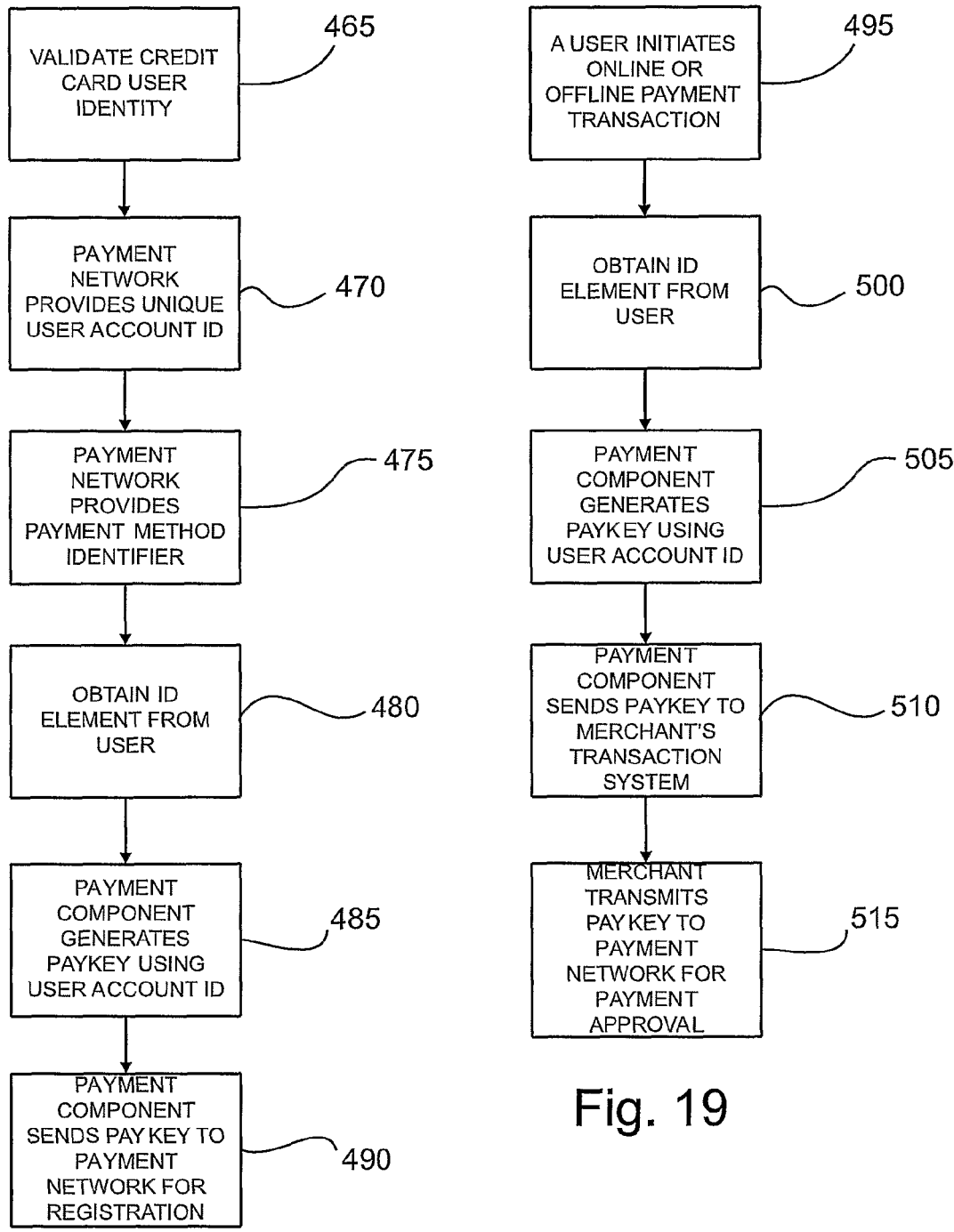
FIG. 18 is a flow chart of the process of an exemplary embodiment registering a payment passkey ("paykey") with a payment processing system.
FIG. 19 is a flow chart of the process of an exemplary embodiment using a payment passkey ("paykey") with a payment processing system.

FIG. 18 is a flow chart of the process of registering a payment passkey (paykey) with a payment system or payment system network in an exemplary embodiment.

A user provides proof of identity 465 to a payment processing system. The data provided by the user may include any number of personally identifying information elements such as social security number along with payment related information such as credit card. Such information is used to validate the user to a specific payment account, for example a credit card account number.

The process of a user providing identifying information, and the subsequent validation by the payment network may be a completely automated process, as for example occurring in a web browsing session, or it may be achieved partially automated, or completely manual process whereas payment processing system or merchant staff may process and verify the information.

At a step 470, the payment network provides a unique user account identifier related to the user's payment account. For optimum security, this user account identifier should not be the user's payment account number, for example a credit card number.

The payment network also provides a payment method identifier 475 which is used to further identify the user payment account and guarantee uniqueness of each user payment account on the payment system network.

This multi-part identifier may be reduced to a single identifier method, or increased to a three part or more identifier implementation as necessary to ensure all user payment accounts to be processed by the system are uniquely identified. An example of a multi part identifier based system in current payment systems in which a user provides a credit card type such as Visa along with their credit card number in order to uniquely identify a payment account.

At a step 480, the user provides an ID element as described in FIGS. 11, 12, 13, 14, 15, and 16.

The payment component generates a paykey 485 using the user account ID combined with the payment method identifier, or with only the user account identifier in systems utilizing a single identifier mechanism.

The paykey is generated utilizing the authentication passkey generation methods as described in FIGS. 2, 3, 4, 5, and 6.

The payment component sends the paykey to the payment system network 490 for registration and storage for future payment transaction validation.

FIG. 19 is a flow chart of the process of a payment transaction utilizing the payment component and a payment system network in an exemplary embodiment.

A user initiates a payment transaction 495 in which a payment account has been previously registered with the payment network and paykey generated as described in FIG. 18.

At a step 500, the user provides an ID element as described in FIGS. 11, 12, 13, 14, 15, and 16.

The payment component generates a paykey 505 using the user account ID combined with the payment method identifier, or with only the user account identifier in systems utilizing a single identifier mechanism.

The paykey is generated utilizing the authentication passkey generation methods as described in FIGS. 2, 3, 4, 5, and 6.

The payment component sends the paykey to the merchant transaction system 510, typically along with a payment amount, for payment transaction validation.

The merchant transmits a payment authorization transaction to the payment system network 515 for approval by the network which may include the capability to instantly verify the paykey and transaction amount or provide deferred approval or denial of the transaction.

Many types of payment mechanisms including but not limited to credit card, debit card, electronic check, automated debit, or other payment system such as Paypal or any public or private payment method and any public or private payment system network could be integrated with the payment component.

Figure 20:
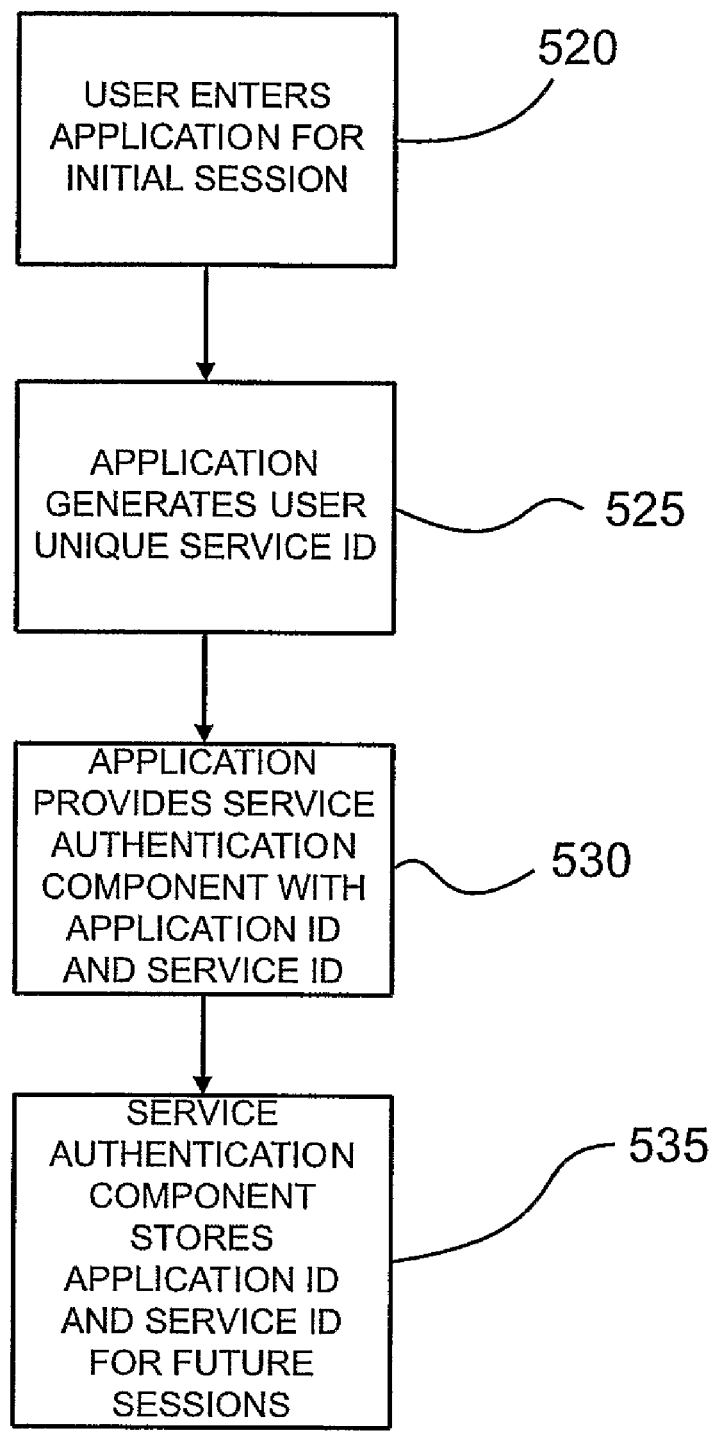
FIG. 20 is a flow chart of the process of an exemplary embodiment registering an application service ID with a service authentication component.

FIG. 20 is a flow chart of the process of registering an application service identifier utilizing a service authentication component in an exemplary embodiment.

The authentication component stores one or more elements during the initial user session of an application for validation in future user sessions.

At a step 520, a user enters an application for an initial session.

The application generates a user unique service identifier 525 and provides it along with an application identifier 530 to the service authentication component.

The service authentication component stores the application identifier and user unique service identifier 535 such that it can be accessed in future user sessions for validation of the service.

Figure 21:
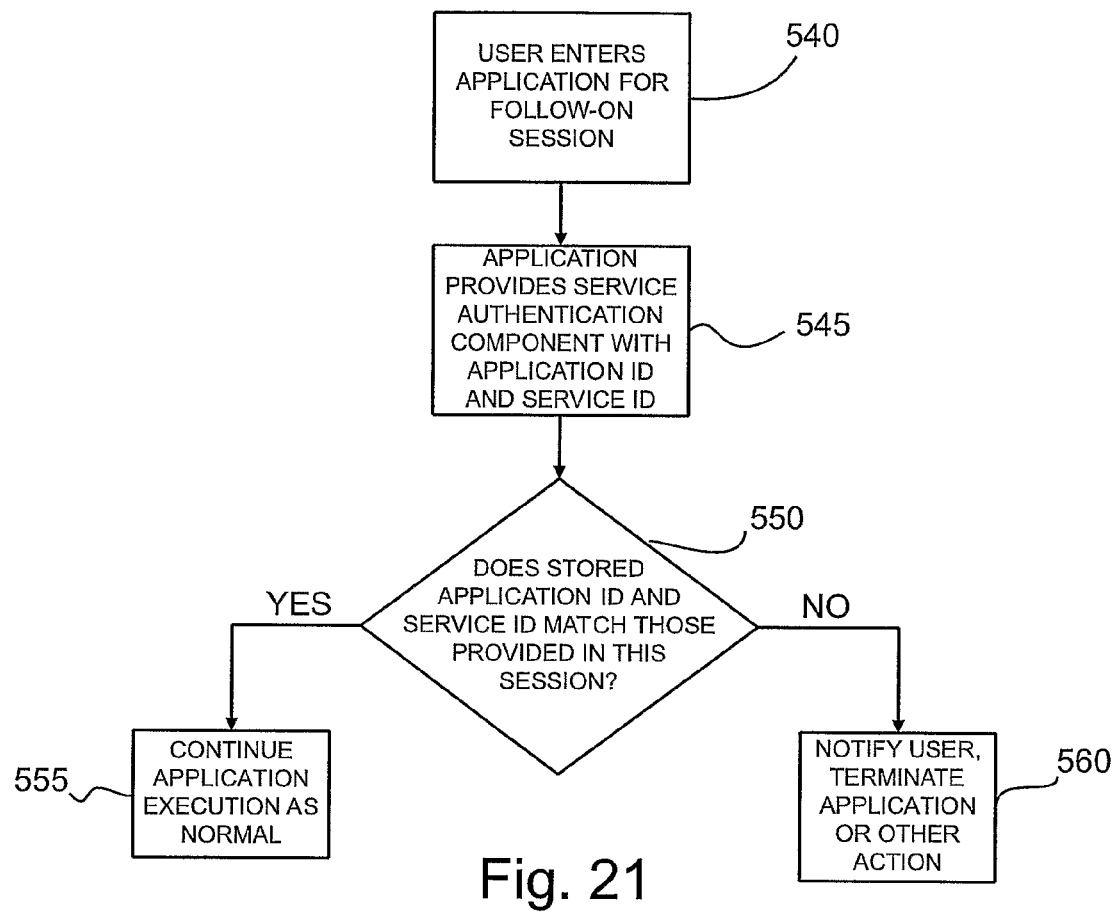
FIG. 21 is a flow chart of the process of an exemplary embodiment validating an application service ID with a service authentication component when the user executes the application.

FIG. 21 is a flow chart of the process of authenticating an application executed by a user utilizing a service authentication component in an exemplary embodiment.

At a step 540, a user enters the application for a subsequent session. Any session after the initial registration session of the application with the service authentication component as described in FIG. 20 is a subsequent session.

The application provides the service authentication component with an application identifier and user unique service identifier 545.

The application identifier and service identifier provided in the current session are compared 550 to those stored by the service authentication component to determine if they are the same.

If the current and stored application identifier and the service identifier are the same then the application will continue execution 555 as normal.

If the current and stored application identifier and the service identifier are not the same, then the authentication component or the application may take some form of action 560. Actions may include notifying the user, discontinuing execution of the application, or any other process which can be incorporated as reaction to the failure of the validation by the service authentication component.

Figure 22:
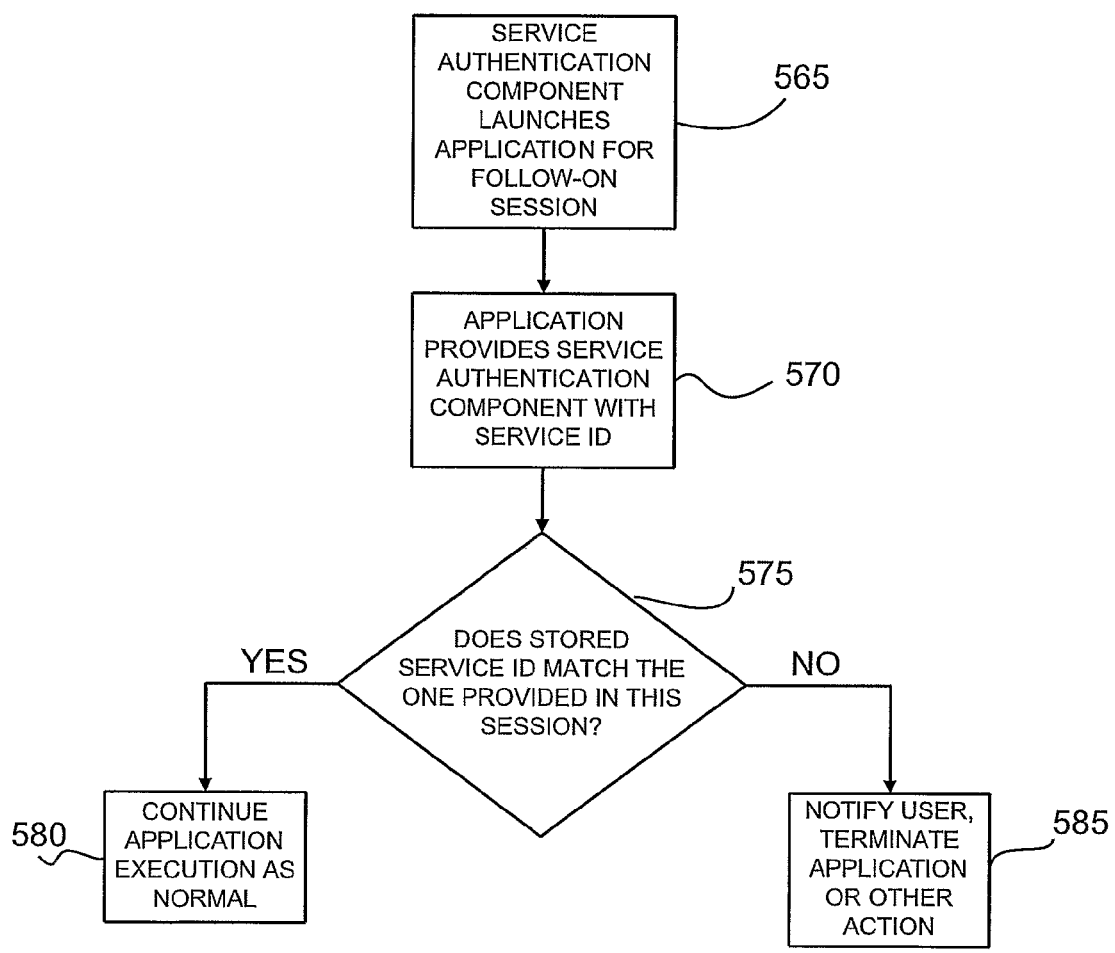
FIG. 22 is a flow chart of the process of an exemplary embodiment validating an application service ID with a service authentication component when a service authentication component executes the application.

FIG. 22 is a flow chart of the process of authenticating an application executed by the service authentication component in an exemplary embodiment.

At a step 565, the service authentication component executes the application for a subsequent session. Any session after the initial registration session of the application with the service authentication component as described in FIG. 20 is a subsequent session.

The application provides the service authentication component with a user unique service identifier 570.

The application identifier for the application, as retrieved from storage is used to retrieve a previously stored service identifier. The service identifier provided in the current session and the stored service identifier are compared 575 to determine if they are the same.

If the current and stored service identifier are the same then the application will continue execution 580 as normal.

If the current and stored service identifier are not the same, then the authentication component or the application may take some form of action 585. Actions may include notifying the user, discontinuing execution of the application, or any other process which can be incorporated as reaction to the failure of the validation by the service authentication component.

Figure 23:
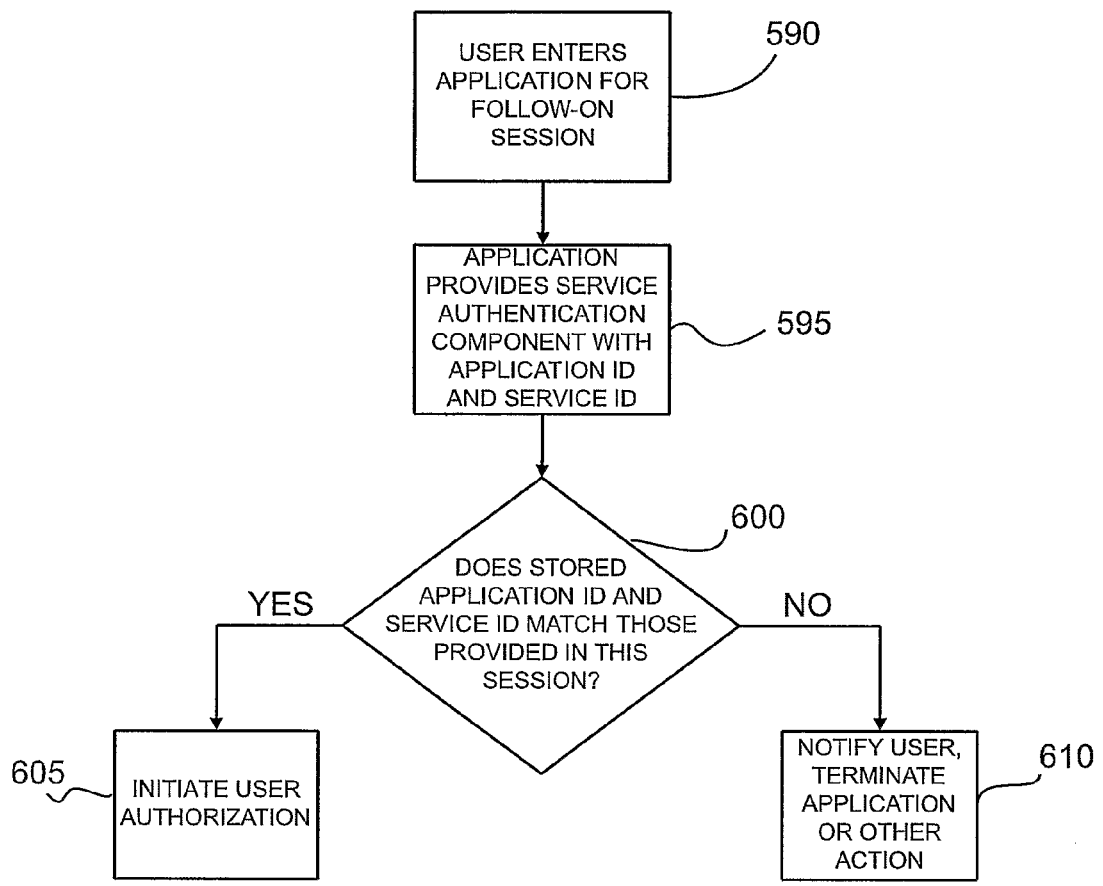
FIG. 23 is a flow chart of the process of an exemplary embodiment validating an application service ID with a service authentication component when the user executes the application prior to authenticating the user.

FIG. 23 is a flow chart of the process of authenticating an application executed by a user prior to application user authentication utilizing a service authentication component in an exemplary embodiment.

At a step 590, a user enters the application for a subsequent session. Any session after the initial registration session of the application with the service authentication component as described in FIG. 20 is a subsequent session.

The application provides the service authentication component with an application identifier and user unique service identifier 595.

The application identifier and service identifier provided in the current session are compared 600 to those stored by the service authentication component to determine if they are the same.

If the current and stored application identifier and the service identifier are the same then the application will initiate user authentication 605 as normal.

If the current and stored application identifier and the service identifier are not the same, then the authentication component or the application may take some form of action 610. Actions may include notifying the user, discontinuing execution of the application, or any other process which can be incorporated as reaction to the failure of the validation by the service authentication component.

This process will ensure that a user will not provide sensitive authentication credentials if the application does not properly identify itself according to the original registration session.

Embodiments described herein provide a valuable tool to users who frequently require access to secure resources associated with a remote network. Because every uniform resource locator (URL) is a unique identifier, the authentication component can utilize a common identifying data element to generate unique passkeys for accessing resources associated with various remote networks, i.e. Yahoo™, Comcast™, BankOne™. As such, the burden of creating and/or remembering several different passwords can be obviated.

Figure 24:
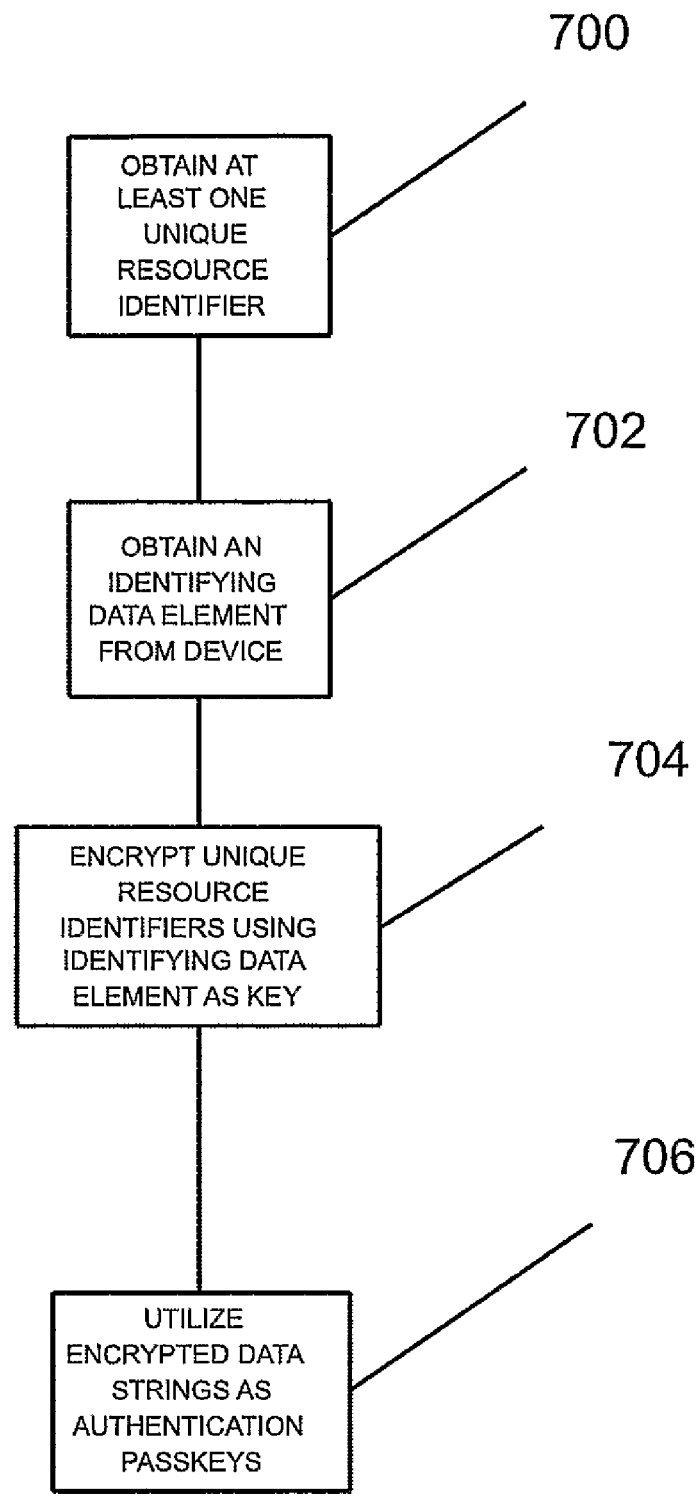
FIG. 24 is a flow chart of a process of authenticating a user session with a resource associated with at least one remote network utilizing an authentication passkey generated using a common identifying data element in an exemplary embodiment.

FIG. 24 is a flow chart of the process of authenticating a user session with a resource associated with at least one remote network utilizing an authentication passkey generated using a common identifying data element in an exemplary embodiment.

At step 700, the authentication component will be provided at least on resource identifier, e.g., URL, for the resource in which the user requires access. The component may also be provided a user account identifier to reduce security risks. The user account identifier and resource identifier may be combined into a single data element. In some embodiments the single data element may be a string variable.

It will be appreciated that manipulation of the individual data elements, or manipulating the resulting combined data element may occur in a number of ways including, but not limited to applying mathematical manipulations, or combining any number of fixed or variable data elements. In order to support repeatable authenticated sessions these manipulations and combinations must be applied such that they can be repeated with the same result in future sessions. The result of any manipulations would be considered the final data element.

At a step 702, a device and its associated hardware drivers, software, application programming interface, or other mechanism will provide an ID element.

The resource identifier, and user account identifier if combined, is encrypted at a step 704, using the ID element as the key to the encryption. It is recognized that any encryption technology may be utilized depending upon the specific implementation. The encryption method is required to deliver a unique encrypted output for any data element and template key combination provided.

At a step 706, the unique encryption is utilized by the authentication component to provide a unique, repeatable passkey that can be generated dynamically for authentication purposes. Thus, for every URL a unique authentication passkey can be generated using a common identifying data element.

The preceding description has been presented only to illustrate and describe exemplary embodiments of the methods and/or systems of the claimed invention. It is not intended to be exhaustive or to limit the claimed invention to any precise form disclosed. It will be understood by those skilled in the art that various changes may be made and equivalents may be substituted for elements thereof without departing from the scope of the invention. In addition, many modifications may be made to adapt a particular system or method to the teachings herein without departing from the scope of the claimed invention. Further, it is anticipated and intended that future developments will occur in the field of information systems, and that the disclosed systems and methods will be incorporated into such future embodiments. Accordingly, it should be understood that the invention is capable of modification and variation and is limited only by the following claims. Therefore, it is intended that the claims appended hereto not be limited to particular embodiment disclosed herein, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A method comprising the steps of:
providing a user account identifier for a resource to an authentication component of a computer system;
providing an identifying data element to the authentication component, the identifying data element being associated with the user account identifier;
combining the user account identifier, identifying data element and a resource identifier into a single data element;
generating a passkey by encrypting the single data element using the identifying data element as a key;
storing the passkey at an application database;
generating a subsequent passkey from the user account identifier and the identifying data element provided to the authorization component; and
comparing the subsequent passkey to the stored passkey.

2. The method of claim 1 wherein the identifying data element is provided by a biometric device.

3. The method of claim 1 wherein the identifying data element is provided utilizing at least one of a keyboard and pointing device.

4. The method of claim 1 wherein the identifying data element is provided utilizing an independent computer program.

5. The method of claim 1 wherein the identifying data element is provided by a measurement device.

6. The method of claim 1 wherein the identifying data element is contained on a portable storage device.

7. The method of claim 1 wherein the identifying data element is associated with a computer system component.

8. The method of claim 1 further comprising the step of manipulating data elements of the single data element prior to encryption.

9. The method of claim 1 further comprising the step of manipulating data elements of the encrypted single data element.

10. The method of claim 1 further comprising the step of using the user account identifier in combination with the identifying data element as the key to encryption.

11. The method of claim 1, further comprising the step of granting access to the resource in response to the subsequent passkey matching the stored passkey.

12. The method of claim 1, wherein the identifying data element and stored passkey are stored in an account identifier record.

13. The method of claim 12, further comprising:
    determining if the account identifier record contains the account identifier;
    determining if the account identifier record contains the stored passkey associated with the account identifier; and
    updating a resource record with the passkey associated with the account identifier in response to no passkey being associated with the account identifier.

14. The method of claim 1, further comprising the steps of:
    creating a biometric template including data associated with the resource, the data including the identifying data element and the account identifier; and
    generating the single data element from the data stored in the biometric template.

15. The method of claim 1, further comprising the steps of:
    determining if an account identifier record contains the account identifier;
    determining if the account identifier record contains the stored passkey associated with the account identifier; and
    updating a resource record with the passkey associated with the account identifier in response to no passkey being associated with the account identifier.

16. The method of claim 1, further comprising the step of storing the identifying data element at an authorization database, the authorization database included at the authorization component.

17. A method comprising the steps of:
    providing a resource identifier to an authentication component of a computer system;
    providing an identifying data element to the authentication component, the identifying data element being associated with the resource identifier;
    combining a user account identifier, the identifying data element and the resource identifier into a single data element;
    generating a passkey by encrypting the single data element using the identifying data element as a key to encryption;
    storing the passkey at an application database;
    generating a subsequent passkey from the resource identifier and the identifying data element provided to the authentication component; and
    comparing the subsequent passkey to the stored passkey.

18. The method of claim 17 further comprising the steps of providing at least one other resource identifier to the authentication component.

19. A method comprising the steps of:
    providing a user account identifier for a resource to an authentication component of a computer system;
    providing an identifying data element to the authentication component, the identifying data element being associated with the user account identifier, wherein the identifying data element is stored in an account identifying record;
    combining the user account identifier, identifying data element and a resource identifier into a single data element;
    generating a passkey by encrypting the data element using the identifying data element as a key;
    determining if the account identifier record contains the account identifier;
    determining if the account identifier record contains a stored passkey associated with the account identifier;
    updating a resource record by storing the passkey associated with the account identifier in response to no passkey being associated with the account identifier;
    generating a subsequent passkey from the user account identifier and the identifying data element provided to the authorization component;
    comparing the subsequent passkey to the stored passkey; and
    granting access to the resource in response to the subsequent passkey matching the stored passkey.

20. The method of claim 19, further comprising the step of using the user account identifier in combination with the identifying data element as the key to encryption.

21. A method comprising the steps of:
    providing a user account identifier for a resource to an authentication component of a computer system;
    providing an identifying data element to the authentication component, the identifying data element being associated with the user account identifier;
    creating a biometric template including data associated with the resource, the data including the identifying data element and the account identifier;
    combining the user account identifier, identifying data element and a resource identifier into a single data element;
    generating a passkey by encrypting the single data element using the identifying data element as a key;
    storing the passkey at an application database;
    generating a subsequent passkey from data stored in the biometric template;
    comparing the subsequent passkey to the stored passkey; and
    granting access to the resource in response to the subsequent passkey matching the stored passkey.

22. The method of claim 21, further comprising using the user account identifier in combination with the identifying data element as the key to encryption.

23. The method of claim 21, further comprising:
    determining if an account identifier record contains the account identifier;
    determining if the account identifier record contains the stored passkey associated with the account identifier; and
    updating a resource record with the passkey associated with the account identifier in response to no passkey being associated with the account identifier.

* * * * *